(No Model.)
D. O'HARA.
SPECTACLE FRAME
No. 359,172. Patented Mar. 8, 1887.
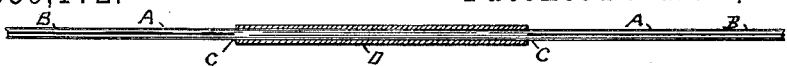
Fig. 1.
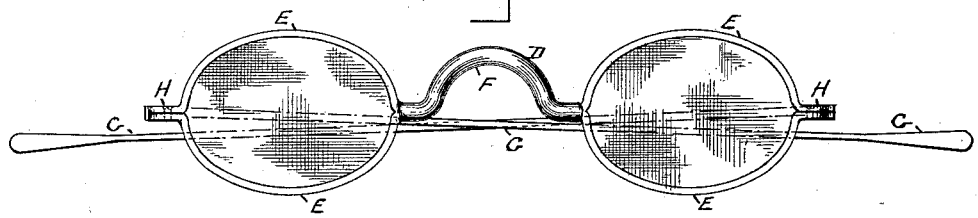
Fig. 2
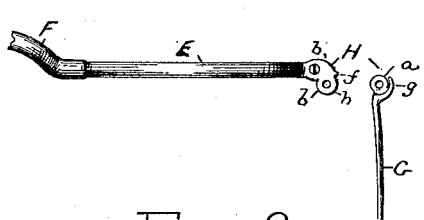
Fig. 4.   Fig. 3.
   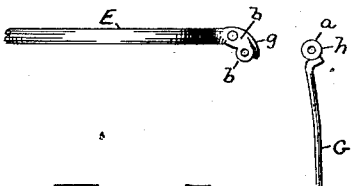
Fig. 6.   Fig. 5.
WITNESSES
Frances M. Brown
Geo. C. Dent
INVENTOR
Daniel O'Hara
by his Attorneys
Brown Bros

UNITED STATES PATENT OFFICE.

DANIEL O'HARA, OF WALTHAM, MASSACHUSETTS.

SPECTACLE-FRAME.

SPECIFICATION forming part of Letters Patent No. 359,172, dated March 8, 1887.

Application filed November 6, 1886. Serial No. 218,192. (No model.)

*To all whom it may concern:*

Be it known that I, DANIEL O'HARA, of Waltham, in the county of Middlesex and State of Massachusetts, have invented certain new and useful Improvements in Spectacle and Eyeglass Frames, of which the following is a full, clear, and exact description.

This invention relates to the construction of the nose-piece or bridge of spectacle and eyeglass frames, and to the jointing or hinging of the temples to spectacle-frames.

In substance the invention consists, in a spectacle or eyeglass frame, of a tube of metal or other suitable material fitting upon and incasing, preferably closely, the nose-piece or bridge, to give it greater stiffness, firmness, and strength.

Again, the invention, in substance, consists in spectacle-frames, of hinges or joints of novel construction, and substantially as hereinafter described, for the temples, and lens-containing rims of the frames.

In the drawings, forming a part of this specification, Figure 1 is a view of a blank prepared with a re-enforcing sleeve at the portion from which the nose-piece or bridge of the spectacle or eyeglass frame is made. Fig. 2 is face view of a spectacle-frame having its nose-piece or bridge re-enforced by an incasing sleeve or tube and the temples jointed in accordance with this invention. Fig. 3 is a view of the upper edge of the frame at one end and of the temple detached from it. Fig. 4 is an enlarged cross-sectional view of the joint. Fig. 5 is a similar view to Fig. 3, but illustrating the spring finger-piece as on the lens-containing rim or frame in lieu of on the temple, as in Fig. 3. Fig. 6 is a perspective view of a spring finger-piece detached.

In the drawings, A represents a blank consisting of a tube of metal split at each end, B, for a portion of its length, and at its central portion, C, incased in a tube, D, of metal or other suitable material, preferably closely fitting the same. From this blank A the spectacle-frame, Fig. 2, consisting of lens-containing rims E and a nose or bridge-piece, F, is produced, all as fully shown and described in my application for Letters Patent of the United States, Serial No. 203,802.

The tube D, incasing the central portion, C, of the blank, which portion, with the blank made into a spectacle-frame, as stated, forms the nose or bridge-piece, imparts additional strength, stiffness, and rigidity to the metal making the bridge.

G G are the temples, and H H the hinges or joints of same to frame A. Each joint H, as shown, is composed of a knuckle, $a$, upon the temple, and of two knuckles, $b$ $b$, upon the frame. Between the knuckles $b$ $b$ the knuckle $a$ of the temple is entered and the whole pinned together by a center pin, $d$, so as to turn one upon another, and, furthermore, for an abutment against a shoulder, $f$, of the frame, limiting the swing of temple, all as well known and of itself, either as a whole or in part, forming no part of this invention.

$g$ is a spring or elastic finger-piece, Fig. 3, shown as on the temple G, and, Fig. 5, as on the lens-containing rim of the spectacle-frame, and in each instance shaped and extending in a direction to have a bearing against the edge or periphery $h$ of that knuckle of the hinge which is on the other part of the spectacle-frame connected together by the hinge. This spring finger-piece secures an elastic and yielding frictional contact and pressure between the temple and the spectacle-frame in the swing of the temple on the frame, and thus compensating for the wear of the hinge, as also assisting in holding or restraining the temples against a too free and easy swing, while at the same time allowing it all necessary freedom of movement.

The spring or elastic finger-piece $g$ may be in one piece either with the lens-containing rim or the temple G, as the case may be, or with the knuckle portion of the hinge, which is on each or of a separate piece therefrom and secured by solder or otherwise thereto.

The knuckle of the joint on which the finger-piece bears should be slightly larger in diameter than the other knuckle forming the other part of the joint.

Having thus described my invention, what I claim, and desire to secure by Letters Patent, is—

1. In a spectacle-frame, the combination, with a nose or bridge-piece, of a tube incasing the same, substantially as described, for the purpose specified.

2. In a spectacle-frame, the combination, with the knuckles of the hinge jointing a temple thereto, of a spring finger-piece arranged to bear and press against the edge or periphery of said knuckles, substantially as described, for the purpose specified.

In testimony whereof I have hereunto set my hand in the presence of two subscribing witnesses.

DANIEL O'HARA.

Witnesses:
GEO. C. BENT,
FRANCES M. BROWN.